United States Patent
Bos et al.

(10) Patent No.: US 7,029,155 B2
(45) Date of Patent: Apr. 18, 2006

(54) MOTOR VEHICLE HEADLIGHT WITH AT LEAST TWO FUNCTIONS

(75) Inventors: Patrice Bos, Bobigny Cedex (FR); Etienne Pauty, Bobigny Cedex (FR)

(73) Assignee: Valeo Vision, Bobigny Cedex (FR)

( * ) Notice: Subject to any disclaimer, the term of this patent is extended or adjusted under 35 U.S.C. 154(b) by 135 days.

(21) Appl. No.: 10/742,107

(22) Filed: Dec. 19, 2003

(65) Prior Publication Data
US 2004/0136200 A1    Jul. 15, 2004

(30) Foreign Application Priority Data
Dec. 20, 2002   (FR)   ................... 02 16428

(51) Int. Cl.
*F21V 17/02*   (2006.01)
(52) U.S. Cl. .................. 362/512; 362/285; 362/322
(58) Field of Classification Search ............. 362/362, 362/512, 513, 510, 538, 539, 521, 277, 282, 362/284, 322
See application file for complete search history.

(56) References Cited

U.S. PATENT DOCUMENTS

| | | | | |
|---|---|---|---|---|
| 5,264,993 A | * | 11/1993 | Neumann et al. | 362/510 |
| 5,673,990 A | * | 10/1997 | Neumann et al. | 362/513 |
| 5,899,559 A | * | 5/1999 | Lachmayer et al. | 362/513 |
| 6,280,067 B1 | * | 8/2001 | Albou | 362/459 |
| 2001/0050344 A1 | * | 12/2001 | Albou | 250/504 R |
| 2002/0001198 A1 | * | 1/2002 | Eschler et al. | 365/510 |

FOREIGN PATENT DOCUMENTS

| | | |
|---|---|---|
| DE | 4435446 | 9/1995 |
| FR | 2709809 | 3/1995 |
| FR | 2754500 | 4/1998 |
| FR | 2756237 | 5/1998 |
| FR | 2788836 | 7/2000 |

* cited by examiner

*Primary Examiner*—John Anthony Ward
*Assistant Examiner*—Gunyoung T. Lee
(74) *Attorney, Agent, or Firm*—Morgan & Finnegan, LLP

(57) ABSTRACT

A motor vehicle headlight comprises a reflector arranged to be oriented along the horizontal axis of the vehicle, together with a light source situated in the vicinity of the focus of the reflector. It also includes a filter which is able to occupy a withdrawn first position in which it does not interfere with the light beam, and a working second position in which it interferes with at least part of the beam. Means are provided for moving the filter between its working and withdrawn positions. The filter is a diffusing and absorbing filter which does not substantially modify the wavelengths of the emergent light as compared with the incident light, and which is arranged so that, with the filter in the working position, a second type of light beam is produced having a reduced intensity, and, optionally, a modified photometric distribution.

7 Claims, 2 Drawing Sheets

MOTOR VEHICLE HEADLIGHT WITH AT LEAST TWO FUNCTIONS

FIELD OF THE INVENTION

This invention relates to a motor vehicle headlight of the kind comprising a reflector arranged to be oriented along the horizontal axis of the vehicle, and a light source situated in the vicinity of the focus of the reflector, whereby to produce a light beam of the main beam or cruising type when the light source is lit, together with at least one filter which is arranged to be able to occupy a withdrawn first position in which it does not interfere with the light beam, and a working second position in which it interferes with at least part of the beam, displacement means being provided for displacing the filter from its working position to its withdrawn position or vice versa, the filter being a diffusing and absorbing filter which does not substantially modify the wavelengths of the emergent light as compared with the incident light, the filter being further arranged so that, in its working position, a second type of light beam is produced with reduced intensity, and, optionally, the photometric distribution is modified, the second type of light beam corresponding to Daytime Running Light (DRL) photometry when the said filter is in its working position, the headlight having a lighting surface area which is at least equal to that necessary for the DRL function.

BACKGROUND OF THE INVENTION

The development of statutory requirements relating to the indicating or signalling functions in motor vehicles is giving rise to an increase in the types of light beam that are to be produced under driving conditions. In order to avoid the need to provide too many different light sources, it is known to provide a plurality of functions corresponding to different types of light beam, all from the same headlight.

In particular, FR 2 756 237 discloses a "main beam" or "cruising" headlight which includes at least one filter opaque to visible radiation but transparent to infrared radiation. This headlight gives two functions, namely that of a normal "main beam" headlight when the filter is in a withdrawn position, and the infrared headlight function when the filter is put into its working position. The infrared radiation enables the road to be illuminated beyond the field of the cruising beams, so as to give the driver, with the aid of equipment comprising a video camera and monitoring screen, an infrared image of that part of the road which is not illuminated by the cruising beams. The headlight proposed by FR 2 756 237 is relatively complicated, and makes use, firstly, of a reflector of the elliptical type having its optical axis oriented transversely to the longitudinal axis of the vehicle, and secondly, a reflector of the parabolic type, the optical axis of which is oriented along the longitudinal axis of the vehicle.

It is also known, especially from EP 0 581 679, to provide a headlight having the twin functions of a cruising headlight and a fog light, in which a lamp of the "H4" type is offset angularly about its geometrical axis with respect to the position which it normally occupies in a conventional main/dipped beam headlight.

Among the requirements for signalling purposes, the regulation as regards daytime lighting in the European Community, entitled "ECE Regulation R87: Daytime Running Light", which will be referred to by the abbreviation DRL in this Application, gives rise to problems in achieving it in practice.

A first solution for the DRL function consists in having the dipped or passing beam lights permanently lit. The photometry of the passing light, which is accepted as a "daytime" light, is however not the specific photometry of the DRL function. In particular, the photometry of the passing light involves an energy consumption which is greater than that necessary for the DRL function, and reduces the useful life of the lamps.

It is possible to provide a specific DRL daytime light, but in this case a cavity, satisfying regulation R87, must be added to the front of the vehicle. At the present time, the illuminating surface required for the DRL function is 40 $cm^2$, and it is not always easy in modern vehicles to find anywhere to put such an illuminating surface on the front of the vehicle.

The foglight function is another example of a lighting function that can be provided in addition to the main beam and dipped beam functions.

DISCUSSION OF THE INVENTION

The main object of the invention is to provide a motor vehicle headlight which, while still being of a simple structure, enables at least two functions to be obtained, in particular the DRL function and/or the foglight function.

According to the invention, a motor vehicle headlight of the kind defined above is characterised by the fact that the diffusing and absorbing filter is arranged so that the second type of light beam, obtained in the working position of the filter, is a fog penetrating beam.

Preferably, the reflector is an elliptical reflector having an optical axis oriented along the axis of the vehicle, with an internal focus and an external focus, the light source being situated in the vicinity of the internal focus of the reflector while a lens is situated in front of the reflector, the focus of the lens being close to, or coincident with, the external focus of the reflector. The headlight may be arranged to produce a cruising light beam when the light source is lit and the filter withdrawn.

The filter, in its withdrawn position, is preferably situated in the shadow zone of the elliptical reflector outside the reflection boundary.

The diffusing and absorbing filter may consist of a ribbed and unpolished glass giving absorption and spread of the light beam which are sufficient for the DRL function. In particular, the rear face of the glass, facing towards the light source, has undergone sand blasting or frosting treatment.

By way of non-limiting example, the light beam along the optical axis of the headlight is divided at least by 10, and in particular by at least 40, when the diffusing and absorbing filter is displaced from its withdrawn position to its working position.

The glass that constitutes the diffusing and absorbing filter may include facets and/or toroidal segments which contribute to the diffusion of the light.

The headlight may include means for supplying the light source with a reduced voltage in order to ensure the DRL function.

Preferably, the filter is combined with a mask which is displaceable with the filter, the mask being adapted so that in the working position it cuts off the beam above a horizontal plane. The mask is preferably focussed and the filter unfocussed.

The headlight may include at least one further filter, being an infrared filter for modifying the wavelength of the light beam emitted, thereby providing a third function.

Following on from the arrangements disclosed above, the invention also embraces a number of other arrangements, which will be described more fully below in connection with embodiments to be described by way of example and with reference to the attached drawings, but which are in no way limiting.

DESCRIPTION OF PREFERRED
EMBODIMENTS OF THE INVENTION

Figure 1:
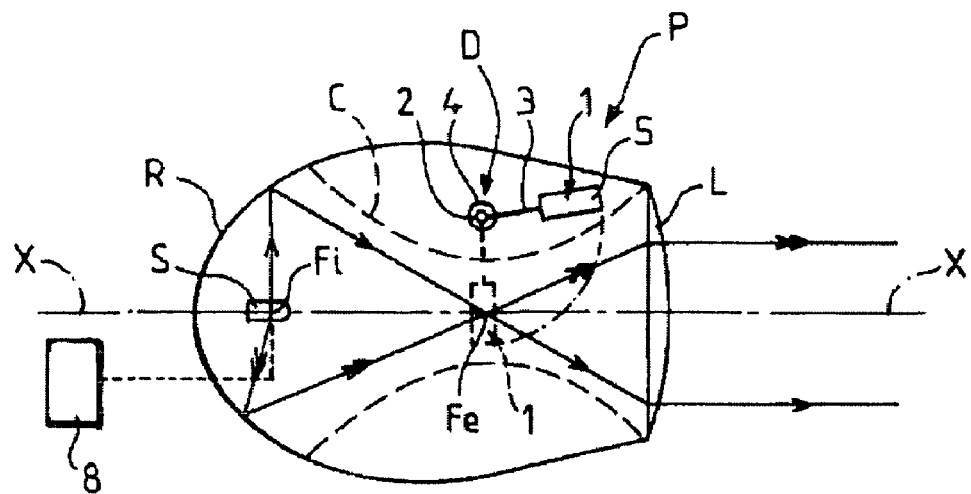
FIG. 1 is a diagrammatic axial vertical cross section of a headlight according to the invention.

With reference to FIG. 1, this shows a headlight P for a motor vehicle, comprising a reflector R with an optical axis X—X oriented along the longitudinal axis of the vehicle, not shown.

The reflector R preferably consists of an elliptical reflector having an internal focus Fi and an external focus Fe. A light source S, which is for example a filament lamp or a discharge lamp, is situated in the vicinity of the internal focus Fi of the reflector. A convergent lens L is situated in front of the reflector R (in the direction of propagation of the light rays), the focus of the lens L being close to or coincident with the external focus Fe of the reflector R. The assembly of the reflector R and lens L constitutes an elliptical module.

When the light source S is lit, the headlight P produces a cruising light beam. In another version, however, the headlight P may be arranged to give a dipped or passing beam.

The headlight P includes a diffusing and absorbing filter 1 which is arranged to occupy a withdrawn first position which is shown in full lines in FIG. 1, in which it does not interfere with the light beams, and a working second position shown in broken lines in FIG. 1. In the working position, the filter 1 interferes with at least part of the beam so as to produce a second type of light beam, the intensity of which is reduced and which has a modified photometric distribution, the wavelengths of the beam being essentially preserved.

In the embodiment shown in FIG. 1, the filter 1 is so arranged that, in its working position, the light beam delivered by the headlight P corresponds to DRL photometry as defined above, the headlight P having a lighting surface area which is at least equal to that which is necessary for the DRL function. In practice, since the lighting surface area required for the DRL function is 40 cm², it is necessary that the surface of the lens L will then be at least equal to 40 cm², which corresponds to a lens diameter of at least 7.2 cm.

In its withdrawn position, the filter 1 lies within the shadow zone of the reflector, outside the reflection boundary C, or envelope surface for reflected rays.

Means D are arranged to displace the filter 1 from the withdrawn position to the working position and vice versa.

In the embodiment of FIG. 1, the filter 1 is rotatable about a horizontal pivot rod 2 which is at right angles to the plane of FIG. 1 and which is situated above the optical axis X—X. The filter 1 is carried by an arm 3 which is coupled in rotation to the pivot rod 2. Control of the rotary movement of the pivot rod 2 is provided by an electric motor 4, which is shown diagrammatically.

In its working position, the filter 1 is preferably situated at the focus or close to the focus Fe, with the mean plane of the filter being orthogonal to the optical axis X—X.

In another version, the filter 1 could be carried by an arm which is articulated about a horizontal axis situated below the optical axis X—X, or even about a vertical axis orthogonal to the optical axis X—X and situated either in front of the plane of FIG. 1 or behind it.

In a further version, instead of being made rotatable about an axis, the filter 1 could be made movable in straight line motion, vertically or horizontally and at right angles to the axis X—X. The filter displacement means D could then consist of an actuator controlling the straight line motion of the filter 1.

Figure 2:
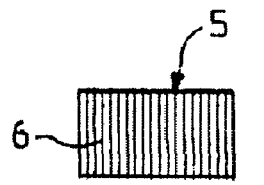
FIG. 2 is a diagrammatic front view on a larger scale, of the diffusing and absorbing filter for the reflector of FIG. 1.

The filter 1 may consist of a glass 5, having for example a rectangular contour the major dimension of which, in the working position of the filter, is horizontal and at right angles to the plane of FIG. 1. The glass 5 is arranged to ensure sufficiently high absorption and spreading of the light beam. For example, the front face of the glass 5 includes vertical ribs 6 (FIG. 2). It would also be possible to provide toroidal segments or facets which are bounded by vertical ribs and horizontal ribs.

Figure 3:
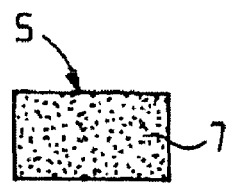
FIG. 3 is a rear elevation of the filter.

The rear face 7 (FIG. 3) of the glass 5 may be sand-blasted or frosted, in order to diffuse and spread the light in the horizontal plane as well as in the vertical plane.

The absorbency of the filter 1 is sufficiently high so that, starting from a cruising light beam having a light intensity along the optical axis which may be at least 30,000 candelas, a satisfactory DRL beam can be obtained with the filter 1 in its working position, that is to say a beam which must have a light intensity along the optical axis which is less than or equal to 800 candelas.

In a further version which enables energy to be economised, the reduction in light intensity in the DRL beam is obtained, wholly or partly, by means of an electrical power supply 8 which gives an undervoltage of the source S. The main function of the filter 1 is then to spread the light beam and to absorb it as little as possible.

Figure 5:
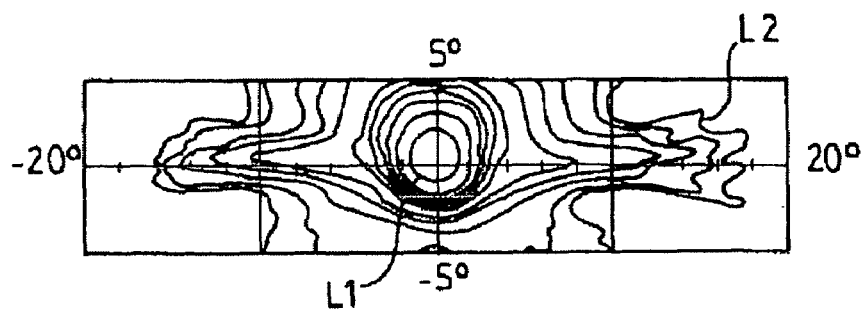
FIG. 5 illustrates the photometry of the cruising function of the headlight.

FIG. 5 Illustrates the photometry of the cruising function provided by the headlight P when the filter 1 is in its withdrawn position and the light source S is lit under its nominal voltage. The photometry of FIG. 5 shows isolux curves on a screen which is situated at 25 meters from the headlight P and at right angles to the optical axis. The central curve L1 corresponds to a level of 48 lux, and the outer curve L2 to a level of 0.4 lux, the intermediate curves corresponding to lighting levels which diminish progressively from the centre towards the outside. The horizontal axis corresponds to the horizontal plane passing through the optical axis of the reflector. The graduations on this horizontal axis correspond to the angle defined between the optical axis and a horizontal direction which passes through the external focus Fe, intersecting the screen at the level of tho graduation. The vertical axis corresponds to the trace of the vertical plane passing through the optical axis, on the plane of the photometry, and the graduations correspond to the angle defined between the optical axis and a direction situated in a vertical plane, passing through the focus Fe and intersecting the plane of photometry at the point of the graduation.

It can be seen from FIG. 5 that, in the cruising function, the beam is concentrated on the optical axis of the headlight, with a high level of illumination for angles substantially in the range ±5°, both horizontally and vertically.

Figure 6:
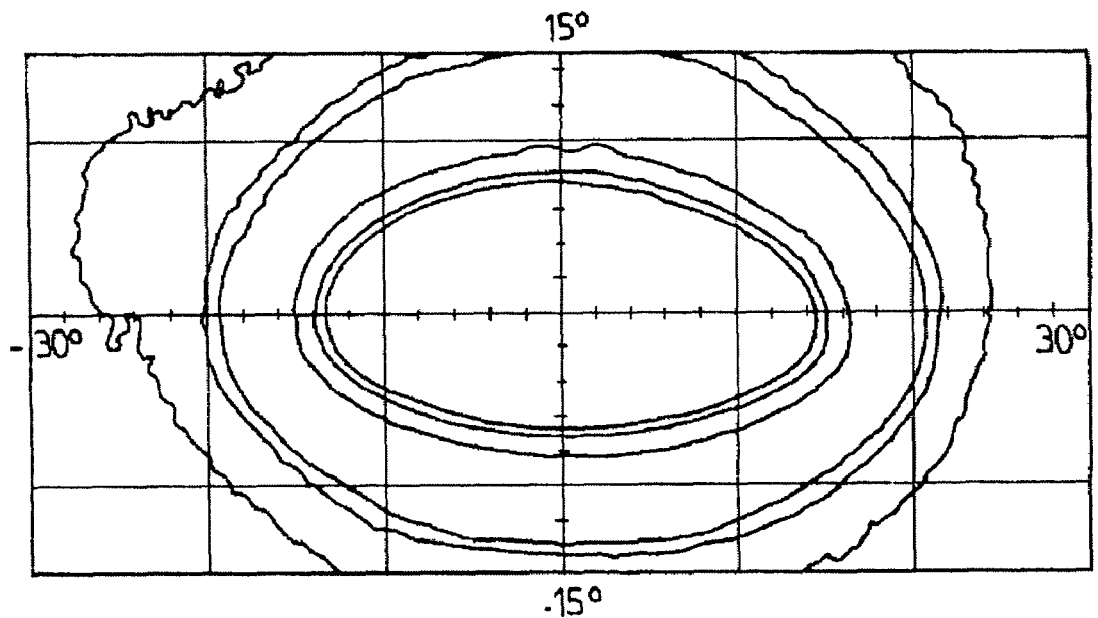
FIG. 6 illustrates the photometry of the DRL function.

FIG. 6 shows the photometry of the isolux curves which are obtained with the headlight P of FIG. 1 when the filter 1 is in its working position to provide the DRL function. The central curves correspond to a spread of around ±12° on either side of the optical axis in the horizontal plane, and about ±8° in the vertical plane, which shows the spread of the beam produced with the filter 1. The lighting level is reduced by the absorption of the filter 1 or the reduced voltage of the light source, in such a way as to satisfy the requirements of the DRL function.

Figure 4:
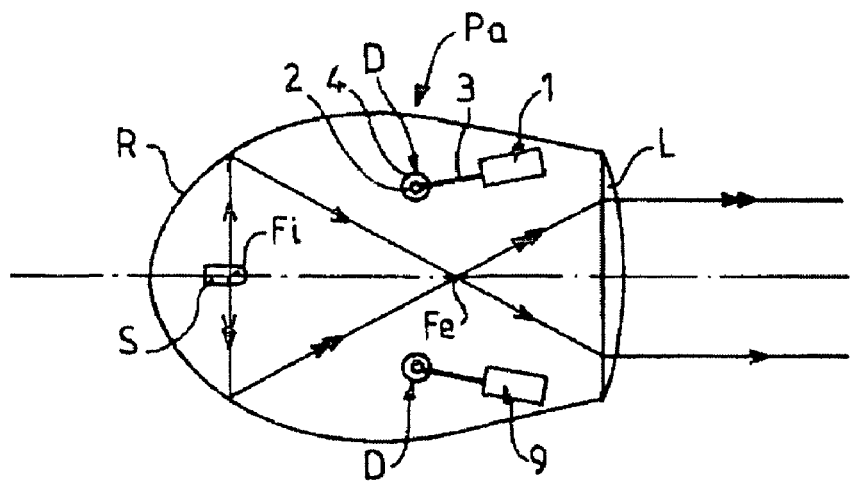
FIG. 4 shows, in a similar way to FIG. 1, another embodiment of the headlight.

FIG. 4 shows a further embodiment of a headlight, Pa, which, besides the filter 1 of FIG. 1, also includes an infrared filter 9 which can be put into a withdrawn position shown in full lines in FIG. 4, or into a working position in which it interrupts the light beam so that only an infrared beam will be delivered. The combination of the filter 9 and the means for displacing this filter can be similar to those used for the filter 1. When one of the two filters 1 or 9 is in its working position, the other filter 9 or 1 is held in its withdrawn position.

The two filters 1 and 9 may be mounted on a common base.

The headlight Pa is thus able to provide three functions, namely: the cruising function when the light source S is lit at nominal voltage, with the filters 1 and 9 in their withdrawn positions; the DRL function with the filter 1 in its working position and, optionally, the light source S supplied with a reduced voltage; and the infrared headlight function with the infrared filter 9 in its working position and the filter 1 in its withdrawn position.

So far, this description has been considering a headlight P or Pa in which the second type of light beam obtained with the filter 1 in its working position is a beam corresponding to the DRL function.

Figure 7:
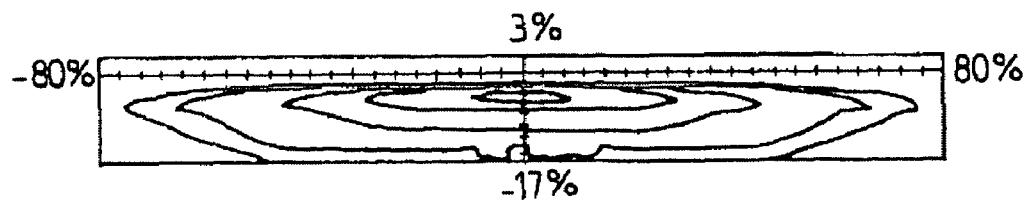
FIG. 7 illustrates the photometry of the foglight function.

It is however possible to envisage a headlight in which the second type of light beam is a fog penetrating beam with the photometry illustrated in FIG. 7, in which the percentage graduations represented on the axes of the diagram correspond to the tangents of the angles of inclination of the light rays on the vertical photometry plane. The foglight beam is cut off above a horizontal plane. This cut-off may be effected by an opaque mask, the displacement of which is linked to that of the filter 1. Preferably, the mask which provides the cut-off above the horizontal plane is focussed, that is to say in its working position it lies in a plane at right angles to the optical axis and passing through the external focus of the headlight. The filter 1 can be unfocussed and it is preferably located behind the external focus of the reflector when it is in its working position.

FIG. 7 shows a wider spread of the isolux curves than in the cruising function illustrated by FIG. 5. The filter 1 is arranged to ensure this spread, derived from the cruising beam of FIG. 5. In addition, the lighting level in accordance with the photometry of the foglight in FIG. 7 is lower than that in the cruising function.

The invention enables an existing cruising headlight to be given a second function, in particular the foglight function, in a simple way and in the same cavity. A third function, for example the DRL function or the infrared function, is also possible.

What is claimed is:

1. A motor vehicle headlight comprising:
    a reflector defining a focus and arranged to be oriented along a horizontal axis of the vehicle; a light source situated in the vicinity of the focus of the reflector, whereby to produce a light beam of the cruising type when the light source is lit;
    at least one filter which is arranged to be able to occupy a withdrawn first position in which interference with the said beam by the filter is absent, and a working second position, in which the filter interferes with at least part of the said beam; and
    displacement means for displacing the filter between its working and withdrawn positions, the filter being a diffusing and absorbing filter, and being adapted so that any substantial modification of the wavelength of the emergent light as compared with the incident light is absent, the filter being further arranged so that, in its working position, it reduces the intensity of the said beam so that the headlight produces a second type of light beam with reduced intensity, the filter being optionally further arranged to modify the photometric distribution, the said second type of light beam corresponding to Daytime Running Light (DRL) photometry when the said filter is in its working position, the headlight having a lighting surface area which is at least equal to that necessary for the DRL function,
    wherein the said filter consists of a ribbed and unpolished glass giving absorption and spread of the light beam which are sufficient for the DRL function.

2. A headlight according to claim 1, wherein the reflector is an elliptical reflector having an optical axis oriented along the axis of the vehicle, with an internal focus and an external focus, the light source being situated in the vicinity of the said internal focus, and the headlight further including a lens in front of the reflector, the lens having a focus substantially coincident with the said external focus.

3. A headlight according to claim 2 wherein the reflector defines a reflection boundary and, in its withdrawn position, the filter is situated in the shadow zone of the elliptical reflector outside the reflection boundary.

4. A headlight according to claim 1, wherein the said glass has a sand-blasted or frosted rear face facing towards the light source.

5. A headlight according to claim 1, including means for supplying the light source with a reduced voltage in order to ensure the DRL function.

6. A headlight according to claim 1, including at least one further filter, being an infrared filter for modifying the wavelength of the light beam emitted, thereby providing a third function.

7. A headlight according to claim 1, further comprising at least another filter arranged so that the light beam emitted is a fog penetrating beam.

* * * * *